Nov. 17, 1959 H. L. KITSELMAN 2,912,816
DEAD-END
Filed Aug. 13, 1957

INVENTOR.
HARRY L. KITSELMAN
BY
ATTORNEYS

United States Patent Office 2,912,816
Patented Nov. 17, 1959

2,912,816

DEAD-END

Harry L. Kitselman, Muncie, Ind., assignor to Indiana Steel & Wire Company, Inc., Muncie, Ind., a corporation of Indiana Application August 13, 1957, Serial No. 677,930

5 Claims. (Cl. 57—145)

This invention relates to a dead-end adapted to provide means through which one end of a line conductor or similar element may be secured to a support. It has heretofore been proposed to form such a dead-end of a length of hard-drawn wire bent into the form of a narrow, elongated U the legs of which are formed into long-pitch helixes of equal pitch adapted to be wrapped around and into gripping engagement with the line conductor. Even when the helical legs of such a dead-end are formed in a phase relationship designed to maintain them equally spaced about the axis of the conductor when applied thereto, the operation of applying the helically formed legs of the dead-end to the conductor tends to displace the legs axially into contact with each other. As a result, the gripping forces exerted on the line conductor tend to deflect it into a helix of a pitch corresponding to that of the dead-end legs. If the line conductor is stiff relative to the material of the dead-end, such tendency to deform it is not seriously objectionable, as the stiffness of the conductor prevents its deformation and insures maintenance of the gripping effort. However, if the line conductor is relatively flexible, it will be distorted by the gripping effort of the dead-end legs, and a substantial reduction in the gripping effort will occur.

It is an object of this invention to adapt a dead-end of the type indicated for application to a relatively flexible line conductor or similar element and to prevent such element from being deformed in a way which would reduce the grip of the dead-end on it.

In carrying out my invention, I employ a length of hard-drawn wire or similar material bent, like the prior-art dead-end referred to above, into a narrow elongated U-shape with the legs of the U formed into long-pitch helixes; and I supplement the helical dead-end legs with additional line-gripping elements in the form of long-pitch helixes of hard drawn wire. In my dead-end, as applied to the line conductor, turns of the supplemental elements intervene between turns of the legs of the U-shaped element, the helical legs of the U-shaped element and supplemental elements forming a substantially continuous sheath preventing deflection of the line conductor. In most instances, it is preferable to use two supplemental elements with the turns of each interposed between adjacent turns of the helically formed legs of the main element. If desired, the supplemental elements may themselves be the legs of a second U-shaped element, in which case the bight at the end of the dead-end will be double. In the latter event, the bights of the two U-shaped elements are so shaped as to dispose the turns of the several helically formed legs in the appropriate phase relationship, as more fully set forth hereinafter.

Further objects and features of the invention will become apparent from the following more detailed description and from the drawings in which.

Figure 1:
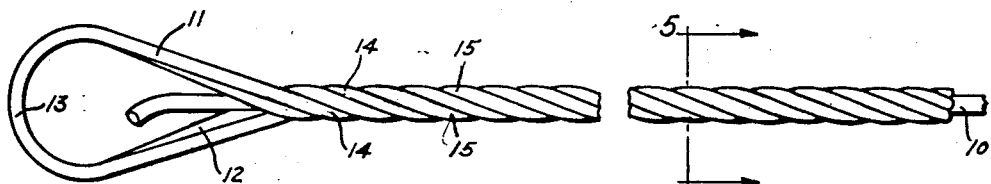
Fig. 1 illustrates one form of a complete dead-end applied to a line conductor.

The dead-end illustrated in Fig. 1 provides means by which a line conductor 10 or like element can be anchored or secured to an appropriate support. The dead-end there shown comprises a pair of elements 11 and 12 each formed of hard-drawn wire or similar material bent into a narrow, elongated U-shape providing a bight 13. The legs of the element 11 are formed into long-pitched helixes 14, while the legs of the element 12 are also formed into helixes 15 of the same pitch.

Figure 2:
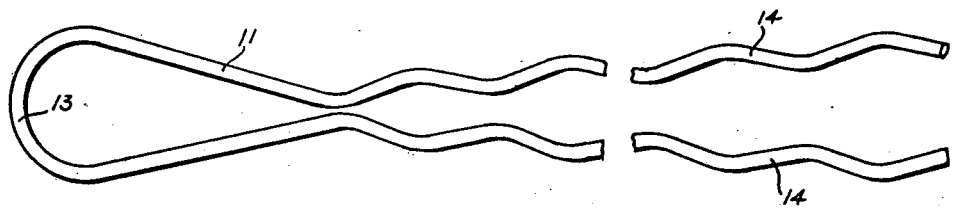
Fig. 2 illustrates one of the two U-shaped elements making up the dead-end of Fig. 1.
Figure 3:
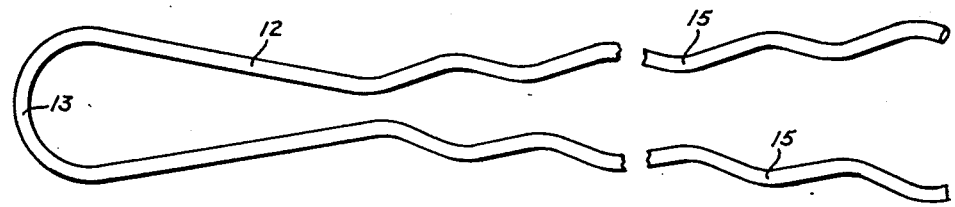
Fig. 3 illustrates the other of such U-shaped elements.

As will be apparent from a comparison of Figs. 2 and 3, the phase relationship of the several helically formed legs of the two elements is such as to tend to maintain their turns at equal intervals on the conductor 10 when the two bights 13 are directly superposed. As shown, the helixes of each element are out of phase with each other by 180°, and the helixes 15 of the element 12 are out of phase by 90° with the helixes 14 of the element 11. When the helixes are so formed with relation to the bights 13 and applied to the conductor 10, turns of each helix 15 will intervene between adjacent turns of the helixes 14.

Conveniently each of the elements 11 and 12 is produced by first forming its end portions into a helix of appropriate diameter and pitch, leaving the intermediate portion of the wire straight, and the wire is then bent within the limits of the straight portion to form the bight 13. If the elements are so formed, and if the two helixes of each element are 180° out of phase with each other, the bight-forming portion of one element, shown as the element 11, should be longer than that of the other element by a distance approximately equal to one-fourth the pitch of the helixes. Application of the helixes to the line will be facilitated if each of the elements is so formed that, when unstressed, its bight is substantially closed and its legs diverge at a slight angle, as shown in Figs. 2 and 3.

Figure 4:
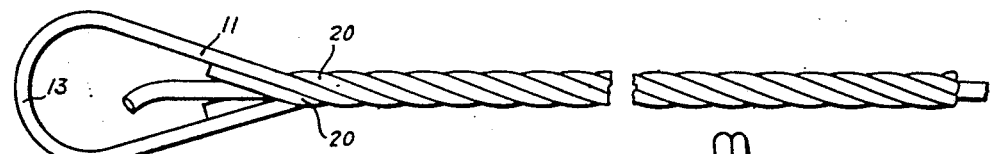
Fig. 4 illustrates a dead-end formed of a single U-shaped element with supplemental spacing elements.
Figure 7:
Fig. 7 is an end elevation of the dead-end as applied to a line conductor.
Figure 5:
Fig. 5 is a transverse section on the line 5—5 of Fig. 1 illustrating the dead-end applied to a circular line conductor.

In the arrangement shown in Fig. 4, I employ a single U-shaped element 11, so formed that its helixes 14 are 180° out of phase with each other. To fill the gaps between adjacent turns of the helixes 14 I employ separate helically formed supplemental elements 20. With the element 11 formed as shown—i.e., with its helixes 180° out of phase with each other—each of the supplemental elements 20 will lie between adjacent turns of the helixes 14 when application of the dead-end to the line 10 is completed. Such supplemental elements not only serve as spacers for the turns of the helixes 14, but, since they grip the line 10, they serve as abutments for such helix-turns and aid in the transmission of axially directed forces between the line and the bight 13.

It will be understood, of course, that the helixes of any of the elements shown will be formed with an internal diameter such that they will resiliently grip the line conductor when applied thereto. The pitch of each helical element is long enough to permit its ready application to the line conductor without the use of tools. As will be obvious, the number of helixes necessary to form a substantially continuous sheath will depend upon the diameter of the line 10, the diameter of the wire from which the helixes are formed, and the pitch of the helixes. It is not essential that the sheath formed by the helixes be absolutely continuous so that no gaps exist between adjacent helical turns, but it is desirable that the maximum possible gap between adjacent turns be less than that which would result in any substantial grip-relaxing deformation of the line 10.

When the dead-end is formed, as in Fig. 1, from a plurality of elements each having a bight 13, it may be desirable to interconnect the several elements, prior to their application to the line, by intertwisting their corresponding legs. This not only serves to hold the elements together in sets but provides, in effect, only two helixes to be applied to the line on the job.

Figure 6:
Fig. 6 is a similar transverse section illustrating the dead-end applied to a line conductor of flattened cross-section.

In referring above to the element gripped by the dead-end as a conductor, I do not imply that the invention is limited to use in association with the conductors. Further, the element gripped need not be circular in cross-section but may, as indicated in Fig. 6, have a flattened or oval shape. Helixes for use in gripping such an element may first be formed in usual manner and then flattened.

It may be advantageous in some instances to provide the dead-end elements with coatings of resilient rubber or like material. Such a coating not only increases friction and lessens the likelihood of slippage of the line but also provides electrical insulation.

Formation of the elements 11 and 12, so that the two helixes of each are 180° out of phase with each other is not essential, as they might be formed with the two helixes of each element 90° out of phase with each other and with the helixes of one element respectively 180° out of phase with the helixes of the other. However, the illustrated arrangement is preferred, as it facilitates the preliminary intertwisting of corresponding legs of the several elements and the simultaneous application of intertwisted legs to the line. A complete dead-end may embody more than two U-shaped elements, preferably formed respectively so that the individual helixes will have a phase relationship appropriate to their cooperation in providing a substantially continuous sheath for the line. When the helically formed legs constitute a substantially continuous sheath the several helixes at every point along their lengths will of necessity be substantially uniformly distributed circumferentially about their common axis. If all helixes bear inwardly against the line with the same force, the resultant of the several forces in every plane transverse to the line will be substantially zero, there will be no tendency to distort the line, and the line will be clamped between the two oppositely disposed helixes of each pair. As a matter of fact, it is not essential to freedom from line distortion that all helixes bear with equal gripping force against the line; for the resultant of all inwardly directed forces will be effectively zero so long as the gripping effort of each helix equals that of the helix directly opposite it. Obviously, a zero resultant of all inwardly directed gripping efforts could also be obtained with an odd number of helixes even though, in such a case, no two helixes would be directly opposite each other. Such a situation might exist in the arrangement shown in Fig. 4, if an odd number of supplemental elements 20 were employed.

I claim as my invention:

1. A dead-end for use in securing a line, comprising a plurality of generally elongated U-shaped elements each having a bight portion and a pair of legs, each of said legs being formed into a long-pitch helix capable of being readily wrapped around a line to grip it elastically, the bight portions of the several elements being of substantially similar shape, free from helical convolutions, and superposable upon each other in aligned relation, said elements being so formed that when their bight-portions are superposed in such aligned relations all the helixes will be out of phase with each other by substantially equal intervals.

2. In combination with a line, a dead-end therefor comprising a plurality of generally elongated U-shaped elements each having a bight portion and a pair of legs, each of said legs being formed into a long-pitch helix wrapped around and elastically gripping the line, the bight portions of the several elements being of substantially similar shape free from helical convolutions, and superposed upon each other in aligned relation, said helixes forming a substantially continuous sheath on the line.

3. In combination with a line, a dead-end therefor comprising a generally elongated U-shape element having a bight portion and a pair of legs, each of said legs having the form of a long-pitch helix surrounding and elastically gripping the line, said bight portion being free of helical convolutions and lying substantially in a single plane, and one or more additional elements in the form of helixes surrounding and elastically gripping the line with their turns intervening between turns of said U-shaped element, the helixes of the additional elements cooperating with those of the U-shaped element to form a substantially continuous sheath for the line.

4. A combination as set forth in claim 3 with the addition that each of said additional elements terminates substantially at the open end of said bight.

5. A dead-end as set forth in claim 1 with the addition that the two helixes of each U-shaped element are out of phase with each other by approximately 180°.

References Cited in the file of this patent

UNITED STATES PATENTS

| 2,202,538 | Selquist | May 28, 1940 |
| 2,587,521 | Peterson | Feb. 26, 1952 |
| 2,761,273 | Peterson | Sept. 4, 1956 |